United States Patent [19]

Morita

[11] Patent Number: 5,283,309

[45] Date of Patent: Feb. 1, 1994

[54] EPOXY-CONTAINING ORGANOPOLYSILOXANE AND METHOD FOR THE PREPARATION THEREOF

[75] Inventor: Yoshitsugu Morita, Chiba, Japan

[73] Assignee: Dow Corning Toray Silicone Co., Ltd., Tokyo, Japan

[21] Appl. No.: 974,780

[22] Filed: Nov. 12, 1992

[30] Foreign Application Priority Data

Nov. 20, 1991 [JP] Japan ................................. 3-331409

[51] Int. Cl.$^5$ ............................................. C08G 77/00
[52] U.S. Cl. ...................................... 528/27; 528/15; 528/31; 528/32; 528/39
[58] Field of Search ........................ 528/15, 31, 27, 39

[56] References Cited

U.S. PATENT DOCUMENTS

| | | | |
|---|---|---|---|
| 2,970,150 | 1/1961 | Bailey | 549/215 |
| 3,431,143 | 3/1969 | Johnson et al. | 549/215 |
| 3,455,877 | 7/1969 | Plueddemann | 549/215 |
| 3,761,444 | 9/1973 | Mendicino et al. | 549/215 |
| 4,279,717 | 7/1981 | Eckberg et al. | 528/12 |
| 4,310,678 | 1/1982 | Blizzard et al. | 556/451 |
| 4,421,904 | 12/1983 | Eckberg et al. | 528/27 |
| 4,677,161 | 6/1987 | Suzuki et al. | 524/862 |
| 4,683,278 | 7/1987 | Suzuki | 528/32 |
| 4,707,531 | 11/1987 | Shirahata | 528/12 |
| 4,822,687 | 4/1989 | Kessel et al. | 528/15 |
| 4,880,882 | 11/1989 | Morita et al. | 525/446 |
| 4,946,921 | 8/1990 | Shirahata | 528/39 |
| 5,011,901 | 4/1991 | Fukutani | 528/42 |
| 5,079,311 | 1/1992 | Colas | 525/478 |

FOREIGN PATENT DOCUMENTS

0458355 11/1991 European Pat. Off. .

*Primary Examiner*—Ralph H. Dean
*Attorney, Agent, or Firm*—Roger H. Borrousch

[57] ABSTRACT

An organopolysiloxane having monofunctional siloxane units (M unit) and tetrafunctional siloxane units (Q unit) and also having in the molecule an epoxy group-containing organic group, a polydiorganosiloxane residue bonded therein across a divalent hydrocarbon group, and optionally alkoxysilylalkyl is useful as an internal stress-relaxing agent, an internal mold-release, and as an adhesion promoter for curable organopolysiloxanes. These organopolysiloxanes are made by an addition reaction.

6 Claims, 2 Drawing Sheets

EPOXY-CONTAINING ORGANOPOLYSILOXANE AND METHOD FOR THE PREPARATION THEREOF

BACKGROUND OF THE INVENTION

1. Technical Field

The present invention relates to organopolysiloxane and method for the preparation thereof. More specifically, the present invention relates to organopolysiloxane (i) that has monofunctional siloxane units (M unit) and tetrafunctional siloxane units (Q unit), (ii) that contains in each molecule at least one epoxy group-containing organic group, and (iii) that contains in each molecule at least one diorganopolysiloxane residue bonded therein through a divalent hydrocarbon group.

2. Prior Art

Various types of MQ organopolysiloxanes are already known in the art. Shirahata in U.S. Pat. No. 4,707,531, issued Nov. 17, 1987, describes a method of making MQ organopolysiloxanes which have long been used as starting materials for varnishes and pressure sensitive adhesives. According to Shirahata an alkyl silicate is dripped into a mixture of an aqueous hydrochloric acid which contains at least 5 weight percent hydrogen chloride and a trialkylsilane or a disiloxane at a temperature of 0° to 90° C. Shirahata and Fukutani in U.S. Pat. No. 4,946,921, issued Aug. 7, 1990, describe a hydroxyphenyl-containing MQ organopolysiloxane of the general formula

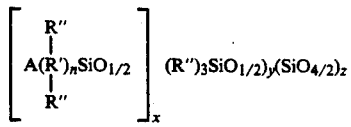

where A is a hydroxyphenyl group. R' is an alkylene group having 1 to 4 carbon atoms, n is zero or one. R" is an alkyl group having 1 to 4 carbon atoms, x and z are positive numbers y is zero or a positive number, x, y, and z have values such that their ratios are $0 \leq (x+y)/z \leq 4$, and $zero \leq y/x \leq 5$.

Fukutani in U.S. Pat. No. 5,011,901, issued Apr. 30, 1991, describes a chloromethyl-containing MQ organopolysiloxane of the general formula

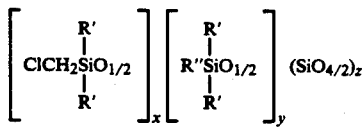

where R' is a monovalent hydrocarbon group having 1 to 6 carbon atoms, R" is a hydrogen atom or a monovalent hydrocarbon group having 1 to 6 carbon atoms, x and y are positive numbers, y is zero or a positive number, and x, y, and z have values such that their ratios are $0.3 \leq (x+y)/z \leq 4$ and $zero \leq y/x \leq 100$.

However, the groups bonded to the silicon in the monofunctional siloxane units (M unit) of these MQ organopolysiloxanes are limited to the hydrogen atom, alkyl, alkenyl hydroxyphenyl, and chloromethyl. There have been no reports of MQ organopolysiloxane in which the silicon in the monofunctional siloxane unit (M unit) carries both an epoxy-containing organic group and a polydiorganosiloxane residue bonded thereto through a divalent hydrocarbon group.

The present invention was developed as the result of extensive investigations by the present inventor in order to solve the preceding problem.

SUMMARY OF THE INVENTION

The present invention takes as its object the introduction of organopolysiloxane that consists of monofunctional siloxane units (M unit) and tetrafunctional siloxane units (Q unit) and that contains in each molecule at least one epoxy-containing organic group and at least one polydiorganosiloxane residue bonded therein across a divalent hydrocarbon group. A further object of the present invention is the introduction of a method for the preparation of this organopolysiloxane.

This invention relates to a composition comprising an organopolysiloxane containing in each molecule at least one epoxy group-containing organic group and at least one polydiorganosiloxane residue where the organopolysiloxane has a general formula

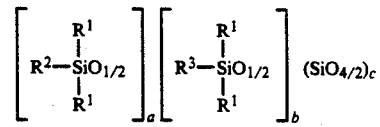

$R^1$ represents monovalent hydrocarbon groups exclusive of alkenyl groups; $R^2$ represents the hydrogen atom and monovalent hydrocarbon groups exclusive of alkenyl groups; $R^3$ is a group selected from the group consisting of epoxy group containing organic groups. alkoxysilylalkyl groups, and polydiorganosiloxane residues as represented by the general formula

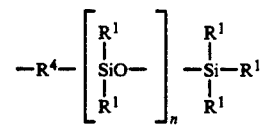

in which $R^1$ represents monovalent hydrocarbon groups exclusive of alkenyl groups, $R^4$ represents divalent hydrocarbon groups, and n has a value of 1 to 500; a is zero or a positive number; b is a positive number; c is a positive number; a/c has a value of zero to 4; b/c has a value of 0,05 to 4; and (a+b)/c has a value of 0.2 to 4.

This invention also relates to a method for the preparation of the organopolysiloxane of claim 1 comprising addition reacting, in the presence of (A) a hydrosilylation-reaction catalyst, (B) an SiH-containing organopolysiloxane with the general formula

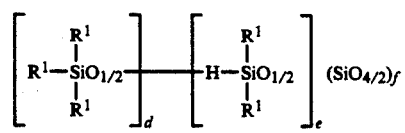

in which $R^1$ represents monovalent hydrocarbon groups exclusive of alkenyl groups, d is zero or a positive number, e is a positive number, f is a positive number, d/f has a value of zero to 4, e/f has a value of 0.05 to 4, and (d+e)/f has a value of 0.2 to 4, C) epoxy-containing aliphatically unsaturated organic compound, (D) polydiorganosiloxane with the general formula

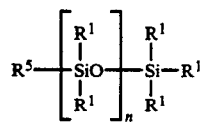

in which $R^1$ represents monovalent hydrocarbon groups exclusive of alkenyl groups, $R^5$ represents alkenyl groups, and u has a value of 1 to 500, and optionally (E) alkoxysilylalkene.

DESCRIPTION OF THE PREFERRED EMBODIMENTS

Figure 1:
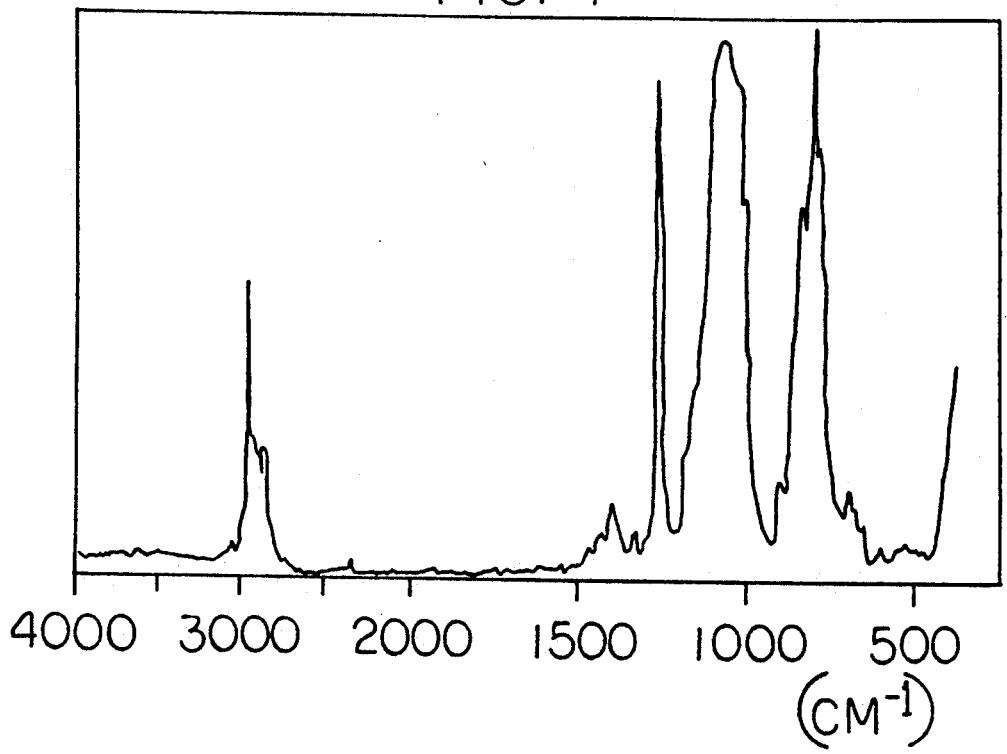
FIG. 1 contains an absorbance infrared spectrogram of the organopolysiloxane prepared in Example 1.

The organopolysiloxane in accordance with the present invention has the general formula given below and contains in each molecule at least one epoxy group-containing organic group and at least one polydiorganosiloxane residue bonded therein across a divalent hydrocarbon group (hereinafter referred to as a divalent hydrocarbon linked polydiorganosiloxane residue).

The organopolysiloxane has a general formula

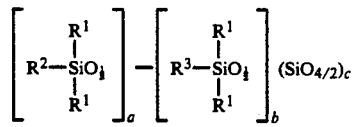

in which $R^1$ in the preceding formula represents monovalenthydrocarbon groups exclusive of alkenyl groups. $R^1$ is specifically but nonexhaustively exemplified by alkyl groups such as methyl, ethyl, propyl, and butyl; aryl groups such as phenyl and tolyl aralkyl groups such as benzyl and phenethyl; and haloalkyl groups such as chloromethyl and 3,3,3-trifluoro-propyl. $R^2$ represents the hydrogen atom and monovalent hydrocarbon groups exclusive of alkenyl groups, and it is specifically but nonexhaustively exemplified by the hydrogen atom and the groups exemplified by $R^1$. The group $R^3$ is a group selected from epoxy-containing organic groups, alkoxysilylalkyl groups, and divalent hydrocarbon-linked polydiorganosiloxane residues. Said epoxy-containing organic groups are specifically exemplified by glycidoxyethyl, glycidoxypropyl, and 3,4-epoxycyclohexylethyl, Said alkoxysilylalkyl groups are specifically exemplified by trimethoxysilylethyl, triethoxy silylethyl, and methyldimethoxysilylethyl. Said divalent hydrocarbon-linked polydiorganosiloxane residue has the following general formula:

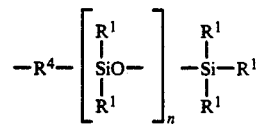

In this formula, $R^1$ is defined above, and $R^4$ represents divalent hydrocarbon groups, and it is specifically exemplified by methylmethylene, ethylene, propylene, methylethylene and butylene. The polydiorganosiloxane residue under consideration is itself specifically exemplified by polydimethylsiloxane residues. polymethylphenylsiloxane residues, dimethylsiloxane-methylphenylsiloxane copolymer residues, and polydiphenylsiloxane residues. The subscript n in the above formula has a value of 1 to 500 for the following reasons: when n = zero the organopolysiloxane of the present invention will not be equipped with the properties associated with the dimethylsiloxane chain: on the other hand, the organopolysiloxane of the present invention becomes difficult to handle when n exceeds 500. The subscript a is zero or a positive number, and it specifies the number of monofunctional siloxane units (M unit) that do not contain epoxy-containing organic groups or divalent hydrocarbon-linked diorganopolysiloxane residues. The subscript is a positive number, and it specifies the number of monofunctional siloxane units (M unit) that carry an epoxy-containing organic group or alkoxysilylalkyl group or divalent hydrocarbon linked diorganopolysiloxane residue. The subscript c is a positive number, and it specifies the number of tetrafunctional siloxane units (Q unit). Furthermore, their ratios are as follows: $a/c = $ zero to 4, $b/c = 0.05$ to 4, and $(a+b)/c = 0.2$ to 4. The bases for these ratios are as follows: there cannot be more than 4M units per 1 Q unit, and, in order for the organopoly-siloxane of the present invention to exhibit a strong stress-relaxing activity and high compatibility for organic resins, at least 0.05 monofunctional siloxane units (M unit) carrying an epoxy-containing organic group or alkoxysilylalkyl group or divalent hydrocarbon-linked diorganopolysiloxane residue must be present per 1 Q unit.

The organopolysiloxane of the present invention is a liquid or solid at room temperature. While its molecular weight is not specifically restricted, molecular weights in the range of 500 to 500,000 are preferred in order to obtain a good compatibility with organic resins.

The preparative method in accordance with the present invention is an addition reaction between (B) an Si—H containing organopolsiloxane, (C) an epoxy containing aliphatically unsaturated organic compound, and (D) an unsaturated polydiorganosiloxane in the presence of (A) a hydrosilylation-reaction catalyst.

The hydrosilylation-reaction catalyst of component (A) is a catalyst of the addition reaction between the silicon-bonded hydrogen atoms in component (B) and the aliphatically unsaturated bonds in components (C), (D), and (E), No specific restriction of the hydrosilylation-reaction catalyst of component (A), as long as, it is a compound generally known for use as a hydrosilylation-reaction catalyst. This component is specifically exemplified by platinum compounds, rhodium compounds, and palladium compounds. Platinum compounds are particularly preferred and these platinum compounds are specifically exemplified by chloroplatinic acid. alcohol solutions of chloroplatinic acid, complexes between platinum and aliphatically unsaturated hydrocarbon compounds, platinum/vinyl-siloxane complexes, platinum black, and Pt/active carbon. Component (A) should be added in a catalytic quantity, and its quantity of addition is not specifically restricted. As an example, when component (A) is a platinum compound, it is preferably used within the range of 0.01 to 500 ppm as platinum metal atoms in (A) based on organopolysiloxane (B), i.e. 0.01 to 500 parts by weight of platinum per one million parts by weight of organopolysiloxane (B).

The SiH-containing organopolysiloxane of component (B) is the main starting material in the present invention, and it has the following general formula.

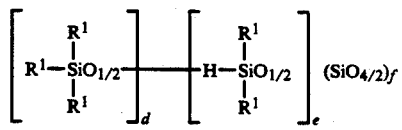

In the preceding formula $R^1$ is defined and illustrated above. The subscript d is zero or a positive number, and it specifies the number of SiH-free monofunctional siloxane units (M unit). The subscript e is a positive number, and it specifies the number of SiH-containing monofunctional siloxane units (M unit). The subscript f is a positive number, and it specifies the number of tetrafunctional siloxane units (Q unit). Their ratios have the following values: $d/f$=zero to 4, $e/f$=0.05 to 4, and $(d+e)/f$=0.2 to 4. The basis for these ratios are as follows, (i) there cannot be more than 4M units per 1 Q unit; (ii) at least 0.05 SiH-containing monofunctional siloxane units (M unit) must be present per 1 Q unit in order for the organo-polysiloxane of the present invention (after introduction of epoxy-containing organic group or alkoxysilylalkyl group or divalent hydrocarbon linked diorganopolysiloxane residue into this organopolysiloxane) to be reactive with organic resins and to exhibit an excellent miscibility with organic resins.

Component (B) can be prepared by methods already known in the art. Methods for the preparation of component (B) are specifically exemplified as follows: (i) the cohydrolysis of tetrahalosilane and monohalosilane. (ii) the cohydrolysis of tetraalkoxysilane and monoalkoxysilane, and (iii) the cohydrolysis of tetraalkoxysilane and tetraorganodisiloxane followed by a re-equilibration polymerization reaction. A preferred method is disclosed in U.S. Pat. No. 4,707,531 which is hereby incorporated by reference to show the preparation of organopolysiloxanes. This method consists of dripping tetraalkoxysilane with stirring into organosilicon compound(s) selected from hexaorganodisiloxane. tetraorganodisiloxane, triorganohalosilane, and diorganohalosilane in aqueous hydrochloric acid solution.

The epoxy-containing aliphatically unsaturated compound of (C) is the component that introduces epoxy-containing organic groups into the organopolysiloxane of the present invention. Component (C) is specifically exemplified by vinyl glycidoxy ether. allyl glycidoxy ether, butenyl glycidoxy ether 1,2-epoxy-4-acrylcyclohexane, 1,2-epoxy-4-vinylcyclo-hexane, 2,3-epoxy-5-vinylnorbornane, and 1,2-epoxy-1-methyl-4-isopropenylcyclohexane.

The polydiorganosiloxane of (D) is the component that introduces the polydiorganosiloxane residue into the organopolysiloxane of the present invention, This polydiorganosiloxane has the following general formula:

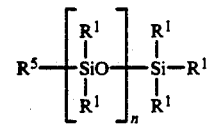

In the preceding formula, $R^1$ is defined and illustrated above. $R^5$ represents alkenyl groups, and it is specifically exemplified by vinyl, allyl, butenyl, and hexenyl. The subscript n is a number with a value of 1 to 500, and it corresponds to the degree of polymerization of this polydiorganosiloxane. Component (D) is specifically exemplified by polydimethyl-siloxane blocked at one molecular chain terminal by dimethylvinylsiloxy and by trimethylsiloxy at the other chain terminal, polymethylphenylsiloxane blocked at one molecular chain terminal by dimethylvinylsiloxy and by trimethylsiloxy at the other chain terminal, dimethylsiloxane-methylphenylsiloxane copolymer blocked at one molecular chain terminal by dimethylvinylsiloxy and by trimethylsiloxy at the other chain terminal, polydiphenylsiloxane blocked at one molecular chain terminal by dimethylvinylsiloxy and by trimethylsiloxy at the other chain terminal.

No particular restrictions apply to the quantities of addition of components (C) and (D) in the preparative method of the present invention. However, due to the difficulty of removing unreacted component (D), component (D) is preferably added in a quantity that provides less than 1 component (D) alkenyl group per 1 silicon-bonded hydrogen atom in component (B). When components (C) plus (D) provide less than 1 aliphatically unsaturated bond per 1 silicon-bonded hydrogen atom in component (B) in the preparative method of the present invention, the resulting organopolysiloxane of the present invention will contain silicon-bonded hydrogen plus epoxy-containing organic group plus divalent hydrocarbon-linked polydiorganosiloxane residue. When components (C) plus (D) provide at least 1 aliphatically unsaturated bond per 1 silicon-bonded hydrogen atom in component (B), organopolysiloxane is produced that is almost free of silicon bonded hydrogen but which contains epoxy-containing organic group and divalent hydrocarbon-linked polydiorganosiloxane residue.

Component (E) is added on an optional basis in the preparative method of the present invention. The alkoxysilyl-alkene of (E) is the component that introduces the alkoxysilyl-alkyl group into the organopolysiloxane of the present invention. Component (E) is specifically exemplified by trimethoxyvinylsilane, methyldimethoxyvinylsilane, dimethyl-methoxyvinylsilane triethoxyvinylsilane, methyldiethoxyvinyl-silane, and trimethoxyallylsilane.

Component (E) is added in the preparative method of the present invention in arbitrary quantities. This component is reacted along with components (C) and (D) when the alkoxysilylalkyl group must be introduced into the organopolysiloxane of the present invention. With regard to the addition of component (E) in the preparative method of the present invention the organopolysiloxane product of the present invention will contain silicon-bonded hydrogen plus epoxy-containing organic group plus alkoxysilylalkyl plus divalent hydrocarbon-linked polydiorganosiloxane residue when components (C) plus (D) plus (E) provide less than 1 aliphatically unsaturated bond per 1 silicon-bonded hydrogen in component (B). The organopolysiloxane product of the present invention will be free of silicon-bonded hydrogen but will contain epoxy-containing organic group plus alkoxysilylalkyl plus divalent hydrocarbon-linked polydiorganosiloxane residue when components (C) plus (D) plus (E) provide at least 1 aliphatically unsaturated bond per 1 silicon-bonded hydrogen in component (B).

Any reaction sequence may be employed in the preparative method of the present invention. Suitable reaction sequences are specifically but nonexhaustively exemplified as follows:

(a) for the case of preparation of organopolysiloxane carrying epoxy-containing organic group, alkoxysilylalkyl, and divalent hydrocarbon-linked polydiorganosiloxane residue, components (A) and (B) are first mixed, components (C) and (D) are then added to this system in order to yield organopoly-siloxane carrying SiH, epoxy-containing organic group, and divalent hydrocarbon-linked diorganopolysiloxane residue, and component (E) is subsequently added to the system in order to afford the target organopolysiloxane; and (b) again for the case of preparation of organopolysiloxane carrying epoxy-containing organic group, alkoxysilylalkyl, and divalent hydrocarbon-linked polydiorganosiloxane residue. components (A) and (B) are first mixed, component (E) is then added to this system in order to afford organopolysiloxane carrying SiH and alkoxysilylalkyl, and components (C) and (D) are subsequently added in order to afford the target organopolysiloxane.

While the reaction temperature in the preparative method of the present invention is not particularly restricted, a reaction temperature range of 50° C. to 150° C. is preferred in order to rapidly bring the addition reaction to completion. Moreover, organic solvent can be used in the preparative method of the present invention. Organic solvents operable for the present invention are specifically but nonexhaustively exemplified by aromatic solvents such as toluene and xylene: aliphatic solvents such as hexane, heptane, and octane; and ketone solvents such as acetone and methyl ethyl ketone. The organopolysiloxane of the present invention prepared as described above is obtained as a reaction mixture, and it can be isolated from this reaction mixture by the distillation of unreacted components (C) and (E).

Because the organopolysiloxane of the present invention contains at least 1 epoxy-containing organic group and at least 1 divalent hydrocarbon-linked polydiorganosiloxane residue in each molecule, it is useful as an internal stress-relaxing agent or internal mold-release agent for thermosetting resin compositions (e.g., of imide resins, phenolic resins, and epoxy resins) or thermoplastic resins (e.g., acrylic resins and polyethylene resins). In addition, when the organopolysiloxane of the present invention contains in each molecule at least 1 epoxy-containing organic group, at least 1 alkoxysilylalkyl group, and at least 1 divalent hydrocarbon-linked polydiorganosiloxane residue, the organopolysiloxane of the present invention is useable as an adhesion promoter for curable organopolysiloxane compositions.

The present invention is explained in greater detail below through the use of illustrative examples. The viscosity values reported in the examples were measured at 25° C. and the parts are parts by weight. The progress of the reactions was monitored by infrared spectrochemical analysis.

EXAMPLE 1

The following were charged to a 1 L four-neck flask equipped with stirrer, reflux condenser, and thermometer: 50 parts of organopolysiloxane with the formula

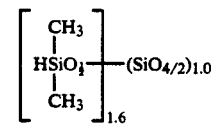

87.9 parts polydimethylsiloxane with the formula

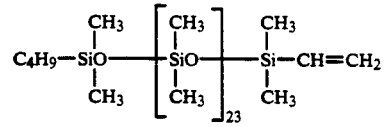

20 parts allyl glycidyl ether, and 200 parts toluene. The system was heated, the water in the system was removed as the azeotrope, and the system was then cooled under a nitrogen blanket. Ten drops 2 weight % isopropanolic chloroplatinic acid solution was dripped into the system from a syringe, and this was followed by heating with stirring, maintenance at 80° C. for 1.5 hours, and cooling to room temperature. 44 Parts allyl glycidyl ether (dried over molecular sieve) was added, and the system was again heated for 2 hours at 110° C. This was followed by heating in vacuo at 120° C./2 mmHg to remove the toluene and excess allyl glycidyl ether and thereby afford 183.3 parts product. This product was transparent at 130° C. and had a viscosity of 0.260 Pa.s. When this product was subjected to infrared spectrochemical analysis, the absorption characteristic of the Si—H bond was not observed in the product. When this product was held at room temperature for 1 month, it separated into an upper layer (brown, transparent) and a lower layer (brown, transparent) at a 23:1 volumetric ratio. The lower layer was determined to be the product afforded by the reaction of only allyl glycidyl ether with the starting organopoly-siloxane. The upper-layer product was determined (gel permeation chromatography calibrated with polystyrene standard) to have a weight-average molecular weight ($M_w$) of 5,790 and a dispersivity ($M_w/M_n$) of 1.22. The epoxy equivalent weight was determined to be 500. The absorbance infrared spectrum was obtained and was as shown in FIG. 1. Fractionation of the upper-layer product by gel permeation chromatography and structural analysis by $^1H$ nuclear magnetic resonance spectroscopy, $^{13}C$ nuclear magnetic resonance spectroscopy, and $^{29}Si$ nuclear magnetic resonance spectroscopy confirmed this to be organopolysiloxane with the following formula:

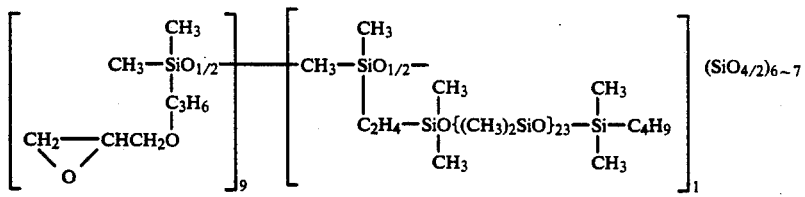

EXAMPLE 2

The following were charged to a 1 L four-neck flask equipped with stirrer, reflux condenser, and thermometer: 50 parts organopolysiloxane with the formula

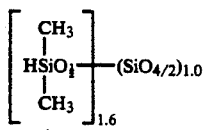

Figure 2:
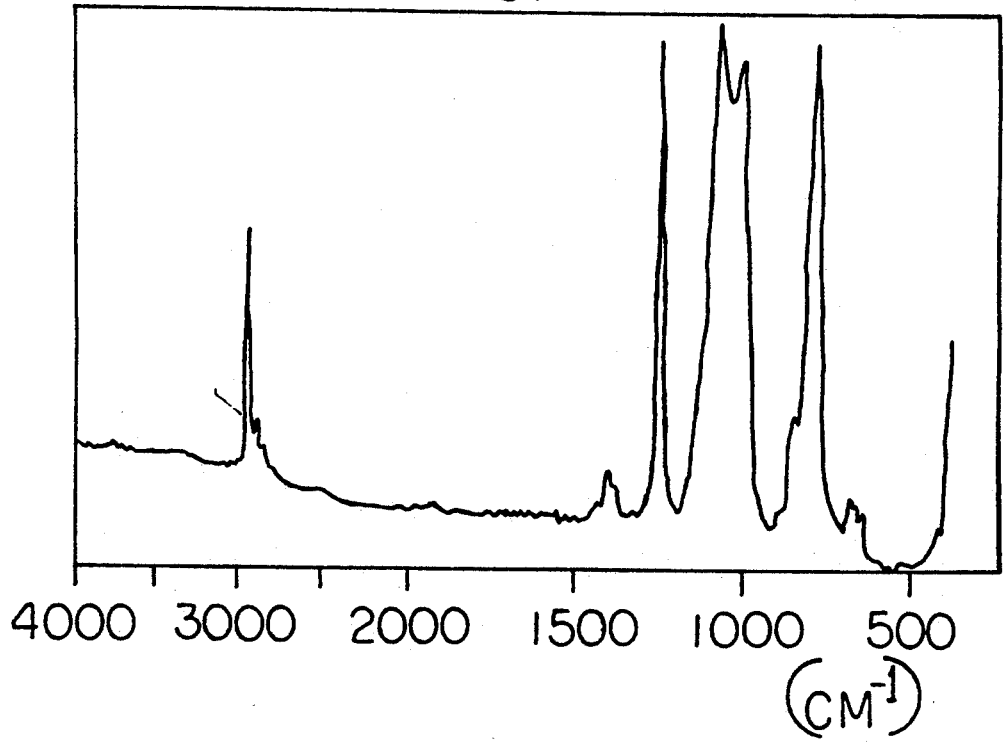
FIG. 2 contains an absorbance infrared spectrogram of the organopolysiloxane prepared in Example 2.

313.9 polydimethylsiloxane with the formula and 200 parts toluene. The system was heated, the water in the system was removed as the azeotrope, and the system was then cooled under a nitrogen blanket. Five drops 2 weight % isopropanolic chloroplatinic acid solution was dripped into the system from a syringe, and this was followed by heating with stirring. maintenance at 80° C. for 3 hours, and cooling to room temperature. 25.4 Parts allyl glycidyl ether (dried over molecular sieve) was added, and the system was again heated for 2 hours at 110° C. This was followed by heating in vacuo at 120° C./2 mmHg to remove the toluene and excess allyl glycidyl ether and thereby afford 410.2 parts product. This product was transparent and had a viscosity of 0.544 Pa.s. When this product was subjected to infrared spectrochemical analysis, the absorption characteristic of the Si—H bond was not observed in the product. When this product was held at room temperature for 4 months, it separated into an upper layer (transparent) and a lower layer (white turbidity, opaque) in a 4.5:1 volumetric ratio. The upper-layer product gave weight-average molecular weights ($M_w$) of 20,100 and 10,280 (gel permeation chromatography calibrated with polystyrene standard) with dispersivities ($M_w/M_n$), respectively, of 1.16 and 1.06, at a ratio of 52:47. The epoxy equivalent weight was determined to be 1,720. The absorbance infrared spectrum was obtained and was as shown in FIG. 2. Fractionation of each of these products by gel permeation chromatography and structural analysis by $^1$H nuclear magnetic resonance spectroscopy, $^{13}$C nuclear magnetic resonance spectroscopy, and $^{29}$Si nuclear magnetic resonance spectroscopy yielded the same absorptions as for the organopolysiloxane synthesized in Example 1 and confirmed the presence of two organopolysiloxanes as represented by the following formulas.

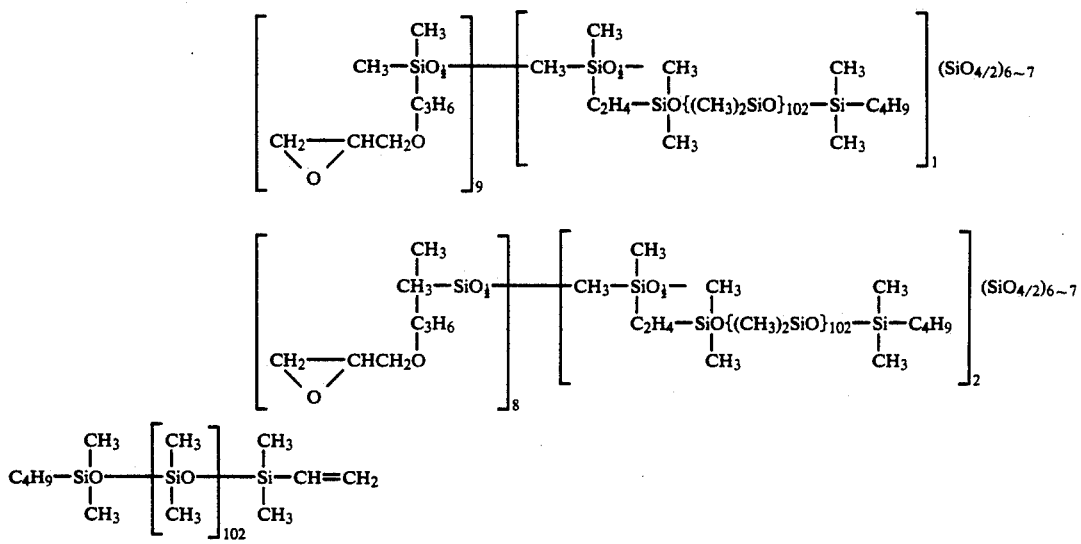

EXAMPLE 3

The following were charged to a 500 mL four-neck flask equipped with stirrer, reflux condenser, and thermometer: 10 parts organopolysiloxane with the formula

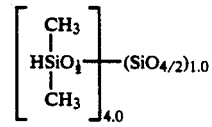

55.7 parts dimethylpolysiloxane with the following formula

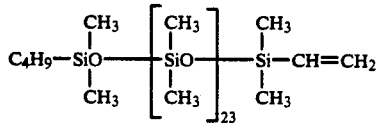

Figure 3:
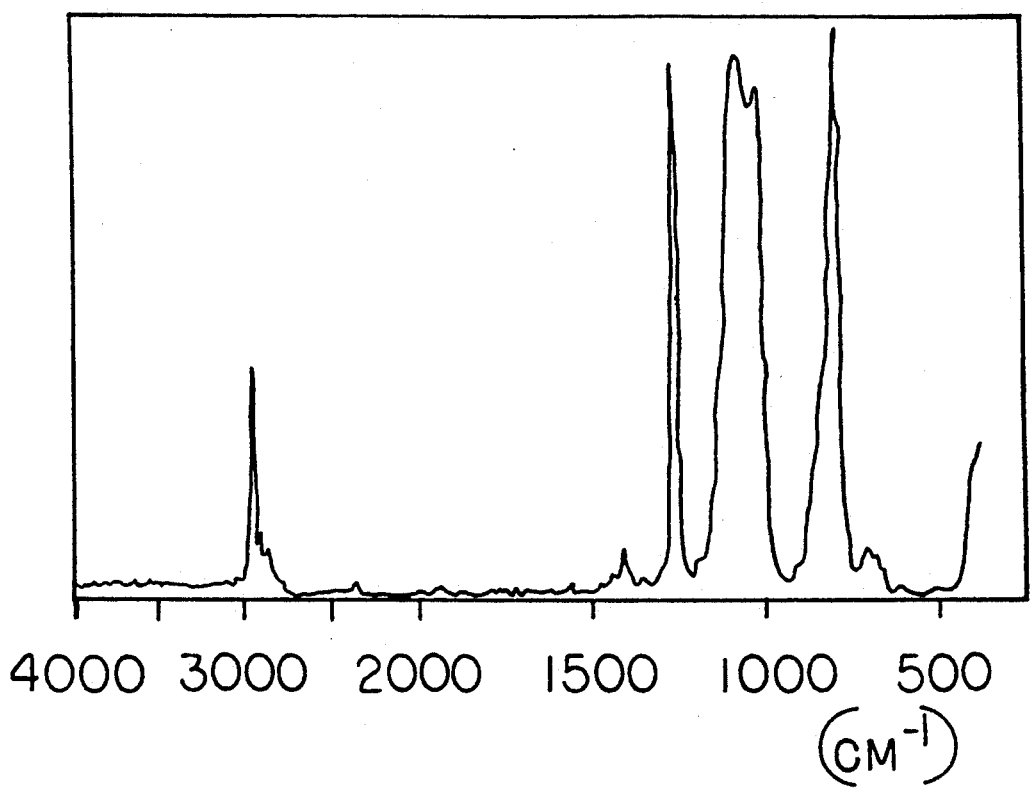
FIG. 3 contains an absorbance infrared spectrogram of the organopolysiloxane prepared in Example 3.

10.4 parts allyl glycidyl ether, and 150 parts toluene. The system was heated, the water in the system was removed as the azeotrope, and the system was then cooled under a nitrogen blanket. Five drops 2 weight % isopropanolic chloroplatinic acid solution was dripped into the system form a syringe, and this was followed by heating with stirring, maintenance at 100° C. for 0.5 hours, and cooling to room temperature. 10.9 Parts allyl glycidyl ether (dried over molecular sieve) was added, and the system was again heated for 2 hours at 110° C. This was followed by heating in vacuo at 120° C./2 mmHg to remove the toluene and excess allyl glycidyl ether and thereby afford 73.2 parts product, This product was transparent. When this product was subjected to infrared spectrochemical analysis, the absorption characteristic of the Si—H bond was not observed in the product. When this product was held at room temperature for 10 months, a small amount of white precipitate was observed, but the obtained liquid was colorless. transparent, and had a viscosity of 0.059 Pa.s. The epoxy equivalent weight of the colorless, transparent liquid was 1.140. The liquid product was determined (gel permeation chromatography calibrated with polystyrene standard) to have a weight-average molecular weight ($M_w$) of 5.360 and a dispersivity ($M_w/M_n$) of 1.22. The absorbance infrared spectrum was obtained and was as shown in FIG. 3. Fractionation of this product by gel permeation chromatography and structural analysis by $^1$H nuclear magnetic resonance spectroscopy, $^{13}$C nuclear magnetic resonance spectroscopy, and $^{29}$Si nuclear magnetic resonance spectroscopy confirmed it to be organopolysiloxane as represented by the following formula:

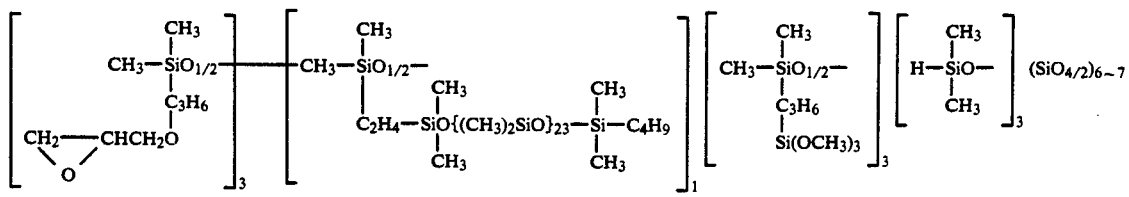

EXAMPLE 4

The following were charged to a 1 L four-neck flask equipped with stirrer, reflux condenser, and thermometer: 50.6 parts organopolysiloxane with the formula

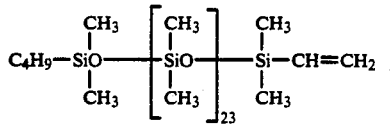

Figure 4:
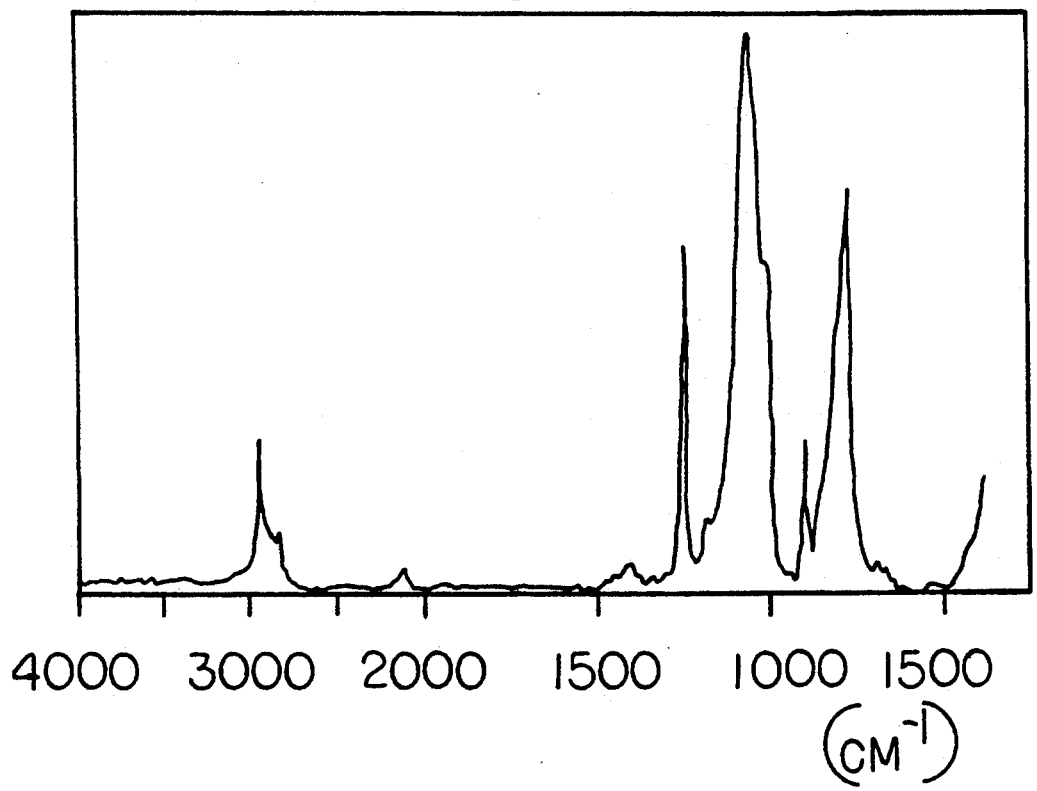
FIG. 4 contains an absorbance infrared spectrogram of the organopolysiloxane prepared in Example 4.

88.9 parts dimethylpolysiloxane with the formula 29.7 parts allyltrimethoxysilane, and 51 parts toluence. The system was heated, the water in the system was removed as the azeotrope, and the system was then cooled under a nitrogen blanket. Two drops 2 weight % isopropanolic chloroplatinic acid solution was dripped into the system from a syringe. This was followed by heating with stirring, maintenance at 120° C. for 1 hour, and cooling to room temperature after confirmation of the reaction of the allyltrimethoxysilane by infrared absorption spectroscopic analysis. 16.6 Parts allyl glycidyl ether (dried over molecular sieve) was added, and the system was again heated for 2 hours at 110° C. This was followed by heating in vacuo at 140° C./2 mmHg to remove the toluene and thereby afford 180.2 parts product. This product was transparent and had a viscosity of 100 Pa.s. When this product was subjected to infrared spectrochemical analysis, the absorption characteristic of residual Si—H bonds was detected in the product and was as shown in FIG. 4. Structural analysis of this product was carried out using $^1$H nuclear magnetic resonance spectroscopy, $^{13}$C nuclear magnetic resonance spectroscopy, and $^{29}$Si nuclear magnetic resonance spectroscopy, and it was confirmed to be organopolysiloxane with the following formula.

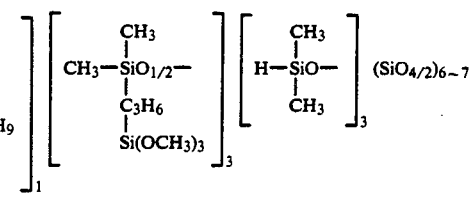

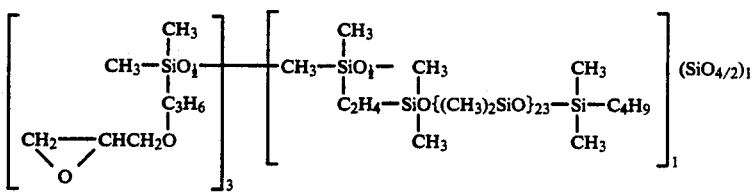

EFFECTS OF THE INVENTION

The organopolysiloxane of the present invention is a novel organopolysiloxane that consists of monofunctional siloxane units and tetrafunctional siloxane units and that contains in each molecule at least one epoxy group-containing organic group and at least one divalent hydrocarbon-linked polydiorganosiloxane residue. The preparative method in accordance with the present invention is characterized by the ability to synthesize this novel organopolysiloxane.

What is claimed is:

1. A composition comprising an organopoly-siloxane containing in each molecule at least one epoxy group-containing organic group and at least one polydiorganosiloxane residue where the organopolysiloxane has a general formula

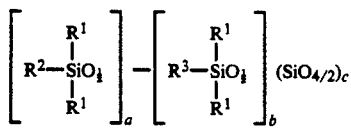

$R^1$ represents monovalent hydrocarbon groups exclusive of alkenyl groups; $R^2$ represents the hydrogen atom or monovalent hydrocarbon groups exclusive of alkenyl groups; $R^3$ is represents epoxy group-containing organic groups, polydiorganosiloxane residues as represented by the general formula

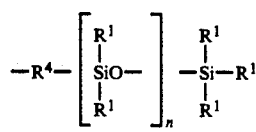

in which $R^1$ represents monovalent hydrocarbon groups exclusive of alkenyl groups, $R^4$ represents divalent hydrocarbon groups, and n has a value of 1 to 500, and optionally alkoxysilylalkyl groups; a is zero or a positive number; b is a positive number; c is a positive number; a/c has a value of zero to 4; b/c has a value of 0.05 to 4; and (a+b)/c has a value of 0.2 to 4.

2. The composition according to claim 1 in which $R^1$ is methyl.

3. The composition according to claim 2 in which the organopolysiloxane has the following units

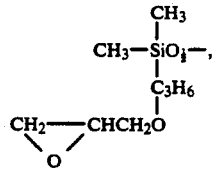

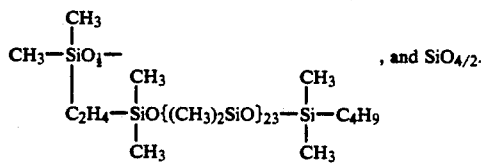

4. The composition according to claim 2 in which the organopolysiloxane has the following units

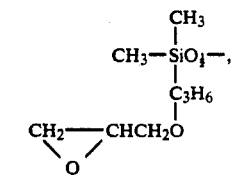

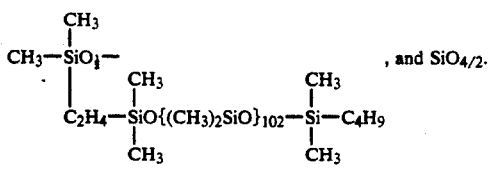

5. The composition according to claim 2 in which the organopolysiloxane has the following units

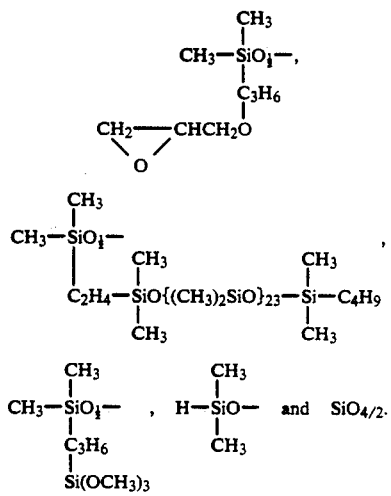

6. A method for the preparation of the organopolysiloxane of claim 1 comprising addition reacting, in the presence of
(A) a hydrosilylation-reaction catalyst.
(B) an SiH-containing organopolysiloxane with the general formula

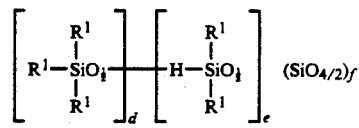

in which $R^1$ represents monovalent hydrocarbon groups exclusive of alkenyl groups, d is zero or a positive number, e is a positive number, f is a positive number, d/f has a value of zero to 4. e/f has a value of 0.05 to 4, and (d+e)/f has a value of 0.2 to 4.
(C) epoxy-containing aliphatically unsaturated organic compound,
(D) polydiorganosiloxane with the general formula

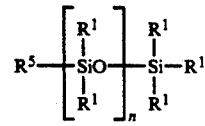

in which $R^1$ represents monovalent hydrocarbon groups exclusive of alkenyl groups, $R^5$ represents alkenyl groups, and n has a value of 1 to 500, and optionally
(E) alkoxysilylalkene.

* * * * *